METHOD OF MAKING PRINTED WIRE CIRCUITRY

Original Filed March 21, 1962

3 Sheets-Sheet 1

INVENTORS
MANUEL C. SANZ
RICHARD W. WYMER
JAMES J. LICARI

Sidney Magnes
AGENT

Oct. 31, 1967 M. C. SANZ ETAL 3,350,250
METHOD OF MAKING PRINTED WIRE CIRCUITRY
Original Filed March 21, 1962
3 Sheets-Sheet 2
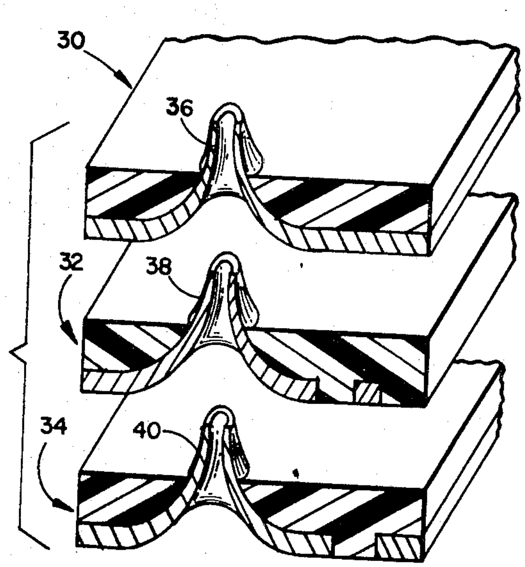
FIG..9
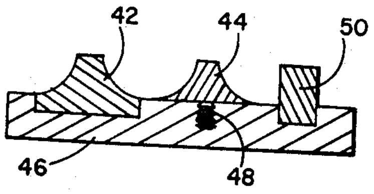
FIG. 12
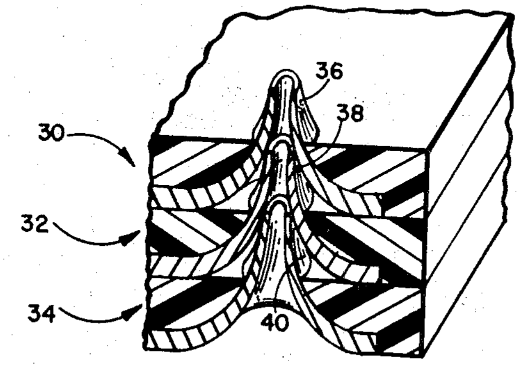
FIG. 10
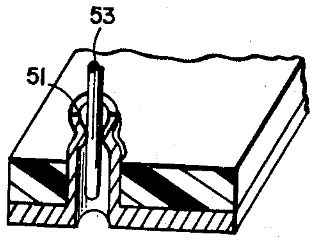
FIG. 13
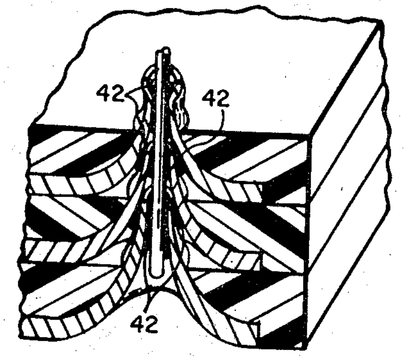
FIG. 11
INVENTORS
MANUEL C. SANZ
RICHARD W. WYMER
JAMES J. LICARI
Sidney Magnee
AGENT

INVENTORS
MANUEL C. SANZ
RICHARD W. WYMER
JAMES J. LICARI

Sidney Magnes
AGENT

United States Patent Office 3,350,250

Patented Oct. 31, 1967

3,350,250

METHOD OF MAKING PRINTED WIRE CIRCUITRY

Manuel C. Sanz, Los Angeles, Richard W. Wymer, Orange, and James J. Licari, Whittier, Calif., assignors to North American Aviation, Inc.

Original application Mar. 21, 1962, Ser. No. 181,386. Divided and this application Feb. 12, 1964, Ser. No. 351,578

1 Claim. (Cl. 156—150)

ABSTRACT OF THE DISCLOSURE

A method is described for constructing printed wire circuitry having protruding electrical conductors which are connected to the electrical circuitry on one surface of an insulating substrate, and which extend through, and project beyond the substrate. The protruding conductors enable multiple layers of printed wire circuitry to be interconnected. The protruding conductors are constructed by depositing electrically conductive material on a stainless base plate having protuberances at the locations where interconnections are desired. An insulating substrate having a thickness less than the height of the protuberances than is integrated with the conductive material, and the printed wire circuitry thus formed is separated from the base plate.

This application is a division of Ser. No. 181,386, filed Mar. 21, 1962, now abandoned.

This invention relates to printed wire circuitry; and more particularly to methods for producing improved multilayer printed wiring boards and connections between the layers thereof.

*Background*

It is well known that modern electronic circuitry is miniaturized, lightened, and improved in many other ways by the use of a concept known as "printed wiring." Briefly stated, this comprises a sheet of insulative material upon which is positioned a pattern of a conductive material, such as copper; the particular configuration of the pattern serving to conduct electricity from one point to another. The resultant pattern looks like printing, hence the term "printed wiring." Such term of course, as used herein also includes etched circuits or other circuits formed by electroplating, electroless plating or other commonly known circuit preparation methods.

In order to pack a large number of circuits into a small volume, a plurality of printed wiring sheets are frequently superimposed, and then laminated to form a unitary, multilayered printed-wire "board."

It is generally necessary to connect some circuits of one printed wiring sheet with those of another printed wiring sheet that is either above or below the first sheet; and in the past it has been extremely difficult to provide satisfactory interconnections between the various layers. In one solution to this problem, holes were drilled through the various layers of the board, wires were inserted into the holes, and soldered in place. This solution required extremely precise positioning of the patterns and drilling of the holes. Another solution drilled holes, and then plated the inner surface of the holes, so that the plating acted as a conductor between the printed wire patterns on the various sheets. The shortcoming of this method was that the plating was generally difficult, and not completely satisfactory. A third solution inserted rivets into the drilled holes; this being unsatisfactory because the rivets did not make good electrical contact with the patterns on the inner sheets.

As a result, the thickness of printed wiring boards was severely limited.

*Objects and drawings*

It is therefore the principal object of our invention to provide an improved printed wiring sheet.

It is another object of our invention to provide an improved printed wiring sheet that incorporates integral inter-sheet connectors.

It is a further object of our invention to provide a method for producing printed wiring sheets that contain integral inter-sheet connectors.

A still further object of this invention is to provide a process of forming printed or etched circuit sheets suitable for forming multi-layer circuits.

Still another object of the invention is to provide means for interconnecting layers of a multilayer electronic circuit.

The attainment of these objects and others will be realized from the following specification, taken in conjunction with the drawings in which FIGURES 1 to 4 show various stages in the production of a printed wiring sheet;

FIGURES 9 to 11 show how the inter-sheet connectors cooperate;

FIGURE 12 shows other ways of obtaining the previously discussed inter-sheet connectors;

FIGURE 13 shows one use of the integral connector; and

*Brief description of the invention*

Broadly stated, our invention contemplates the plating of a conductive material, such as copper, onto the raised portions of an embossed plate; so that the plated copper eventually forms the conductive printed wiring pattern. The embossed plate also has either protuberances or hollows, onto the surface of which copper is also plated to form hollow protrusions that are integral portions of the printed wire pattern. When the printed-wire sheets are assembled, the hollow protrusions internest to act as the intersheet connectors between the conductive patterns of superposed printed wire sheets.

The principles and theories of our invention, as well as several embodiments of the individual components and methods, will be explained in the following specification.

*Detailed description of the invention*

Figure 1:
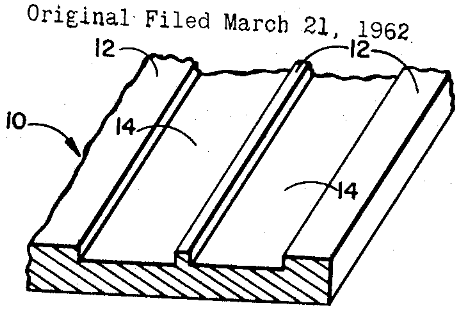
Figure 5:
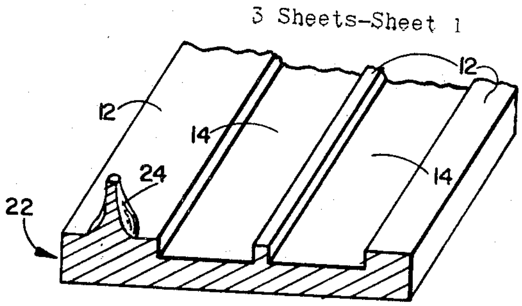
FIGURES 5 to 8 show various stages in the production of a printed wiring sheet incorporating an inter-sheet connector.

The invention will be better understood from a study of the drawings. FIGURE 1 shows a fragmentary portion of an embossed plate 10, that contains raised portions 12 and depressed portions 14; the raised portions having a configuration corresponding to the desired printed wire pattern of the ultimate printed wiring sheet. Plate 10 may be made of any suitable manner; such as by milling, molding, chemical milling, engraving, etc. The engraved plate is preferable because the engraving process produces raised portions that are very sharply defined, may be made as narrow as desired, and have edges that are vertical—rather than undercut.

Figure 2:
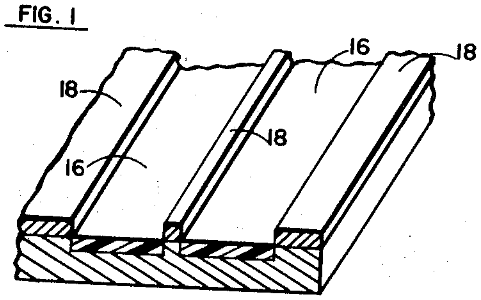

The next step, shown in FIGURE 2, is to coat the depressed portions 14 with a "maskant" 16; this maskant having the characteristic that it adheres to, and protects the masked areas from being plated upon. Many such maskants are available, a suitable one being known as Kodak Photo Resist.

The suitably masked plate 10 is now placed in a plating bath, and a coating of conductive material, such as copper 18, is deposited on the unmasked raised portions of the plate 10. The layer of copper 18 is deposited to the desired thickness, depending upon the design of the printed wiring pattern and the amount of current that the various portions must carry. The plated and masked plate 10 then appears as shown in FIGURE 2.

Plate 10 preferably has the characteristic, or has been so treated previously, that the plated copper does not adhere firmly to it; and may comprise stainless steel or a material that may be oxidized or treated to prevent adhesion.

Figure 3:
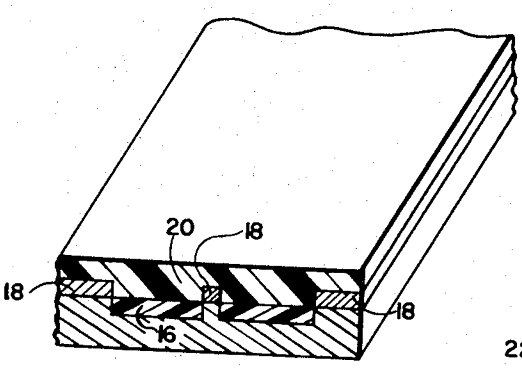

Referring now to FIGURE 3, the next step is to cover the plated printed wiring pattern 18 with an insulative layer, termed a "substrate" 20, such as a plastic or a sheet of fiber glass impregnated with a resin. Substrate 20 is preferably in its raw or semi-cured state, and is positioned upon plate 10 and cured in place by means of suitable pressure and heat. When it is cured the entire assembly appears as shown in FIGURE 3; the copper 18 being integrated into the substrate 20.

Figure 4:
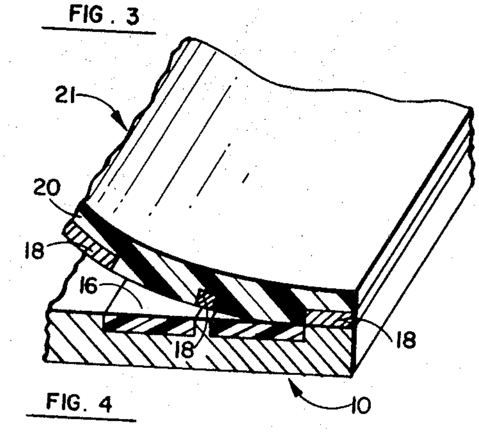

FIGURE 4 shows the separating of the printed wiring sheet 21 from the plate 10. The pattern of plated copper 18 is now integral with and strongly adherent to substrate 20; and poorly adherent to the plate 10. The printed-wire sheet 21, comprising substrate 20 and integral copper plating 18, may therefore be readily peeled from the plate. If desired, the assembly may be either heated or cooled to aid in the separating process. At the end of this step the masked plate is ready to be used again, and the printed wiring sheet 21 may now be incorporated into any desired electrical circuitry.

Attention is now directed to FIGURES 5 to 8. These show a plate 22 similar to the one previously discussed; the difference being that plate 22 has one or more protuberances 24.

Figure 6:
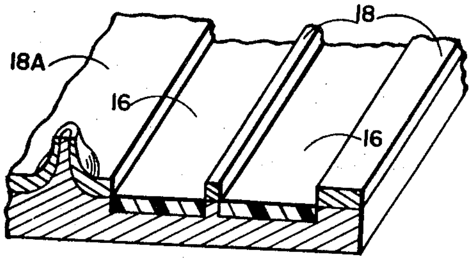

FIGURE 6 shows that the depressed portions of plate 22 have been masked by a maskant 16, and that the raised portions have been plated to form the conductive pattern comprising strips of copper 18. It will be noted from FIGURE 6 that copper strip 18A comprises an integral funnel-shaped protrusion 26, resulting from the plating of copper onto protuberance 24. Only one such protrusion has been shown, but as many may be produced as necessary, and they may be positioned upon selected portions of the printed wiring pattern.

Figure 7:
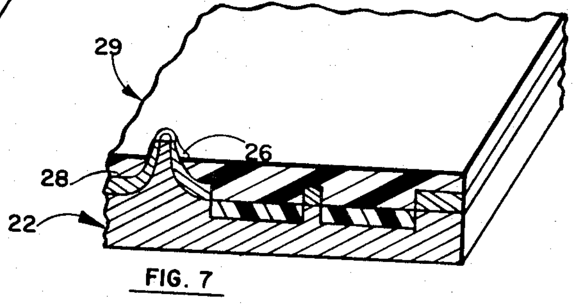

FIGURE 7 shows a substrate 28 placed upon the printed wiring pattern; attention being directed to the fact that protrusion 26 extends through substrate 28, and projects beyond the surface of it. This result is readily achieved, since substrate 28 is uncured and soft, so that the apex of the funnel-shaped protuberance will easily pierce it. If the substrate is of the type that contains fiberglass impregnated with a plastic, this plastic is also uncured and soft, so that the apex of the protrusion easily pierces the plastic and wedges apart the glass fibers. Alternatively substrate 20 may be suitably pierced.

Figure 8:
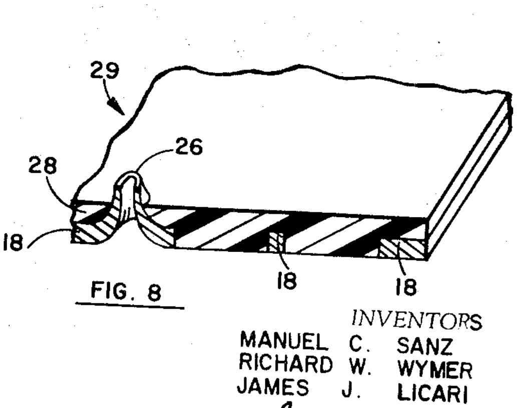

When the printed wiring sheet 29 of FIGURE 7 is peeled from plate 22, it has the appearance shown in FIGURE 8. As may be seen it comprises the desired printed wire pattern; and has in addition, a funnel-like protrusion 26 that is an integral part of the conductive pattern, and projects above the surface of the substrate.

*Use of inter-sheet connectors*

The method of using the funnel-shaped protrusions to inter-connect contiguously positioned boards is shown in FIGURE 9. Here three printed wire sheets 30, 32, and 34 are shown as they would be superposed. In each case a metallic protrusion 36, 38, and 40 is integral with a selected printed wire of its printed wire sheet.

In use, the printed wire sheets are superposed so that the protrusions 36, 38, and 40 internest in the recesses, or hollow portions of the protrusions as shown in FIGURE 10. It is clear that each protrusion makes good mechanical and electrical contact with the protrusion directly above and directly below it.

It is evident from the drawing that by proper design of the height of protrusion 40, by constructing protrusion 30 to have little or no height, and providing no protrusion 36 (for sheet 30) that boards 34 and 32 may be connected together yet remain insulated from board 30. There may be required some insulative material over protrusion 38. In addition, a "jump" connection from layer 34 to layer 30 may be made by removing protrusion 38 and its surrounding copper and permit cone 40 to nest solely inside cone 36.

If, for some reason, an even better electrical contact is desired, flow soldering techniques, dip soldering or welding techniques, may be used. The individual protrusions may be coated with solder 42, as shown in FIGURE 11; and the laminating process, which requires heat and pressure, automatically melts the solder, and causes it to flow to the juxtaposed surfaces of the adjacent protrusions. Alternatively, the entire printed pattern may be coated with solder or a low-melting point metal before being integrated with the substrate, so that the protuberances are automatically coated.

In this way ideal electrical connections are provided between the various portions of the superposed printed wire sheets.

It is obvious from FIGURES 10 and 11 that the resultant hole, or tunnel, will have a substantially uniform diameter. If desired, a wire, a lead wire from an electrical component, or the like, can be inserted through the tunnel formed by the protrusions, and may be either soldered in place, or may have the outermost protrusion crimped and/or welded to the wire to provide mechanical and electrical contact thereto.

In accordance with our invention, as many sheets as desired may be superposed, and still have excellent electrical conductivity between desired printed wiring patterns.

It is thus obvious that our invention permits the production of high-precision multilayered printed wiring boards having as many layers as desired, with excellent electrical contact between any desired portions of the printed wiring pattern on any of the printed wiring sheets.

*Alternate structure*

Referring back to FIGURE 5, it will be noted that in order to form protuberance 24, one must start with a relatively thick plate, and must remove a large amount of material in order to leave a protuberance of the desired height. Under certain conditions this method may be undesirable because of the time and material required to produce the desired result.

Another way of achieving the same result is shown in FIGURE 12, wherein protuberances 42 and 44 are separate elements that are positioned in recesses of plate 46, and held there in any suitable manner. Protuberance 42 may be a force fit, or may be cemented in position; while protuberance 44 is shown as having a threaded stud 48 that can be screwed into a suitably positioned socket of plate 46.

The protrusions thus far discussed have been of the funnel-shaped configuration, so that they may easily internest as shown in FIGURES 10 and 11. Under some conditions, internesting may not be necessary; and a cylindrical protuberance such as 50 of FIGURE 12 will produce a protrusion in the shape of a circular tube. The resultant cylindrical protrusion 51 of FIGURE 13, when used on the outermost printed wire sheet, will accept a lead wire 53 of an electrical component, or the like and can be crimped and/or welded to it as shown.

*Another embodiment*

Another way of overcoming the problem of removing a large amount of material to form a protuberance is shown in FIGURES 14 to 18.

Figure 14:
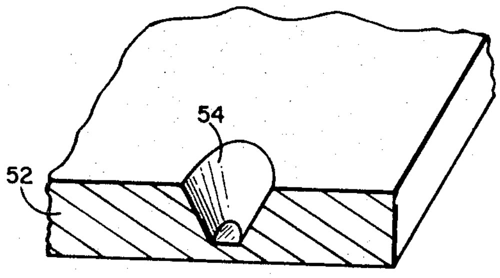
FIGURES 14 to 18 show various stages of another method for producing inter-sheet connectors.
Figure 15:
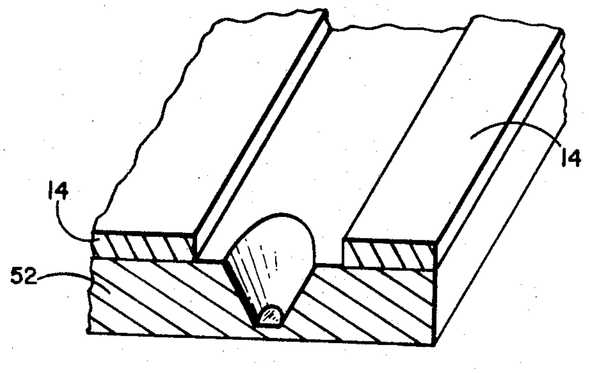
Figure 16:
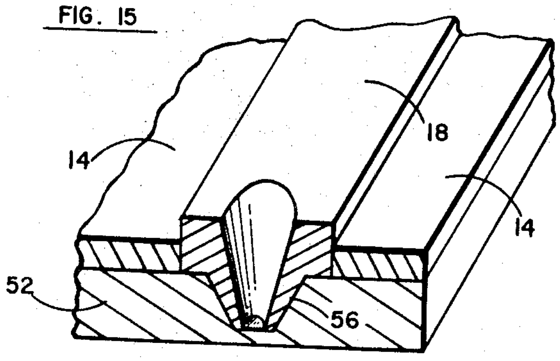
Figure 17:
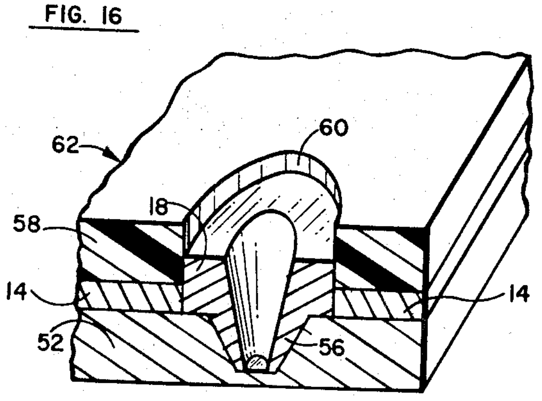

FIGURE 14 shows a plate 52 that has a frusto-conical hole 54 drilled through one surface thereof. FIGURE 15 shows a maskant 14 positioned on plate 52 in the manner previously described. FIGURE 16 shows that copper 18 has been plated onto the masked plate; the resultant copper strip incorporating a funnel-shaped protrusion 56. FIGURE 17 shows a substrate 58 incorporated into the structure; substrate 58 having an opening 60 that is aligned with the protrusion 56.

Figure 18:
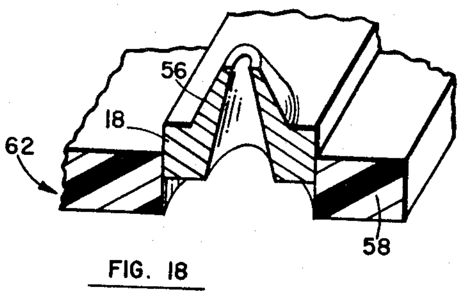

When the printed wiring sheet 62 is peeled from the plate, it appears as shown in FIGURE 18. Here again the funnel-shaped protrusion 56 may be internested with others in order to form the desired electrically conductive interconnections.

If desired, the hole 54 of FIGURE 14 may be cylindrical; whereupon the resultant protrusion would be tubular, as previously described in connection with FIGURE 13.

The foregoing discussion has been conducted in terms of a plate formed of a metal such as stainless steel; but this is not essential. The plate may be made of a wax, a plastic, a low-melting point metal, or the like; and molded to size, shape, and configuration. If desired, the protuberances may be extruded thru suitably sized and positioned holes.

In those cases where the plate material is non-conductive, it may be plated with a conductive material; or may have a conductive material incorporated therein, in this way simulating a metallic plate that may be part of the plating circuit.

When the plate comprises a low-melting point material, it may be melted to liberate the substrate, rather than being peeled therefrom. Plates of this type are cheaper than those of stainless steel; and may be used for development purposes, or where only single printed wiring sheets are desired.

*Advantages*

It may thus be seen that our invention has many advantages over prior-art structures. Firstly it assures good electrical contact between the printed-wire sheets. Secondly, the interconnections can accommodate the lead wires of electrical components. Thirdly, the outermost inter-sheet connector can be crimped or welded to the lead wire and finally, our invention permits the use of more printed-wire sheets than was previously possible, thus allowing more circuitry to be packed into a smaller volume.

Although the invention has been described and illustrated in detail, it is to be understood that the same is by way of illustration and example only and is not to be taken by way of limitation, the spirit and scope of this invention being limited only by the terms of the appended claim.

We claim:

The process of forming on an insulating substrate a printed wire circuit having electrically conducting interconnections extending through and beyond said substrate, the process comprising the steps of providing a stainless steel plate having at least one protuberance extending from the surface thereof to a height greater than the thickness of said insulating substrate, selectively disposing a conductive material on portions of said plate to form an electrical circuit, said portions including said protuberances, disposing a curable, electrically insulating material on at least a portion of said plate and said circuit, the thickness of said insulative material being greater than the thickness of said disposed conductive material but less than the height of said protuberances, so that at least a portion of said conducting material disposed on said protuberances extends above said disposed insulating material, curing said insulating material to form a substrate, and separating said integrated substrate and circuit from said plate.

References Cited

UNITED STATES PATENTS

| | | | |
|---|---|---|---|
| 2,874,085 | 2/1959 | Brietzke | 156—150 |
| 3,013,188 | 12/1961 | Kohler | 317—101 |
| 3,024,151 | 3/1962 | Robinson | 156—150 |
| 3,181,986 | 5/1965 | Pritkin | 156—233 |
| 3,209,066 | 9/1965 | Toomey et al. | 174—68.5 |

EARL M. BERGERT, *Primary Examiner.*

M. L. KATZ, *Assistant Examiner.*